2 Sheets—Sheet 1.
W. BLYTHE & N. HAYES.
APPARATUS FOR TURNING LOCOMOTIVE CRANK PINS.
No. 76,702. Patented Apr. 14, 1868.
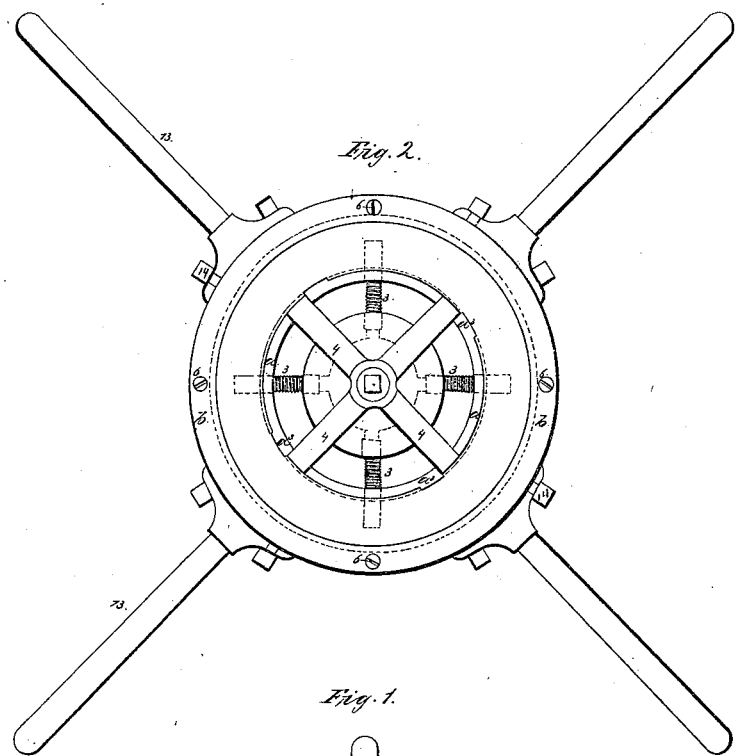
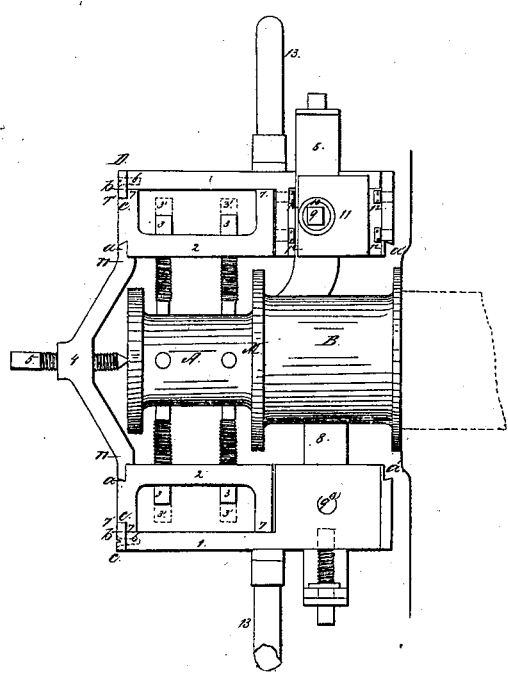

W. BLYTHE & N. HAYES.
APPARATUS FOR TURNING LOCOMOTIVE CRANK PINS.
No. 76,702. Patented Apr. 14, 1868.
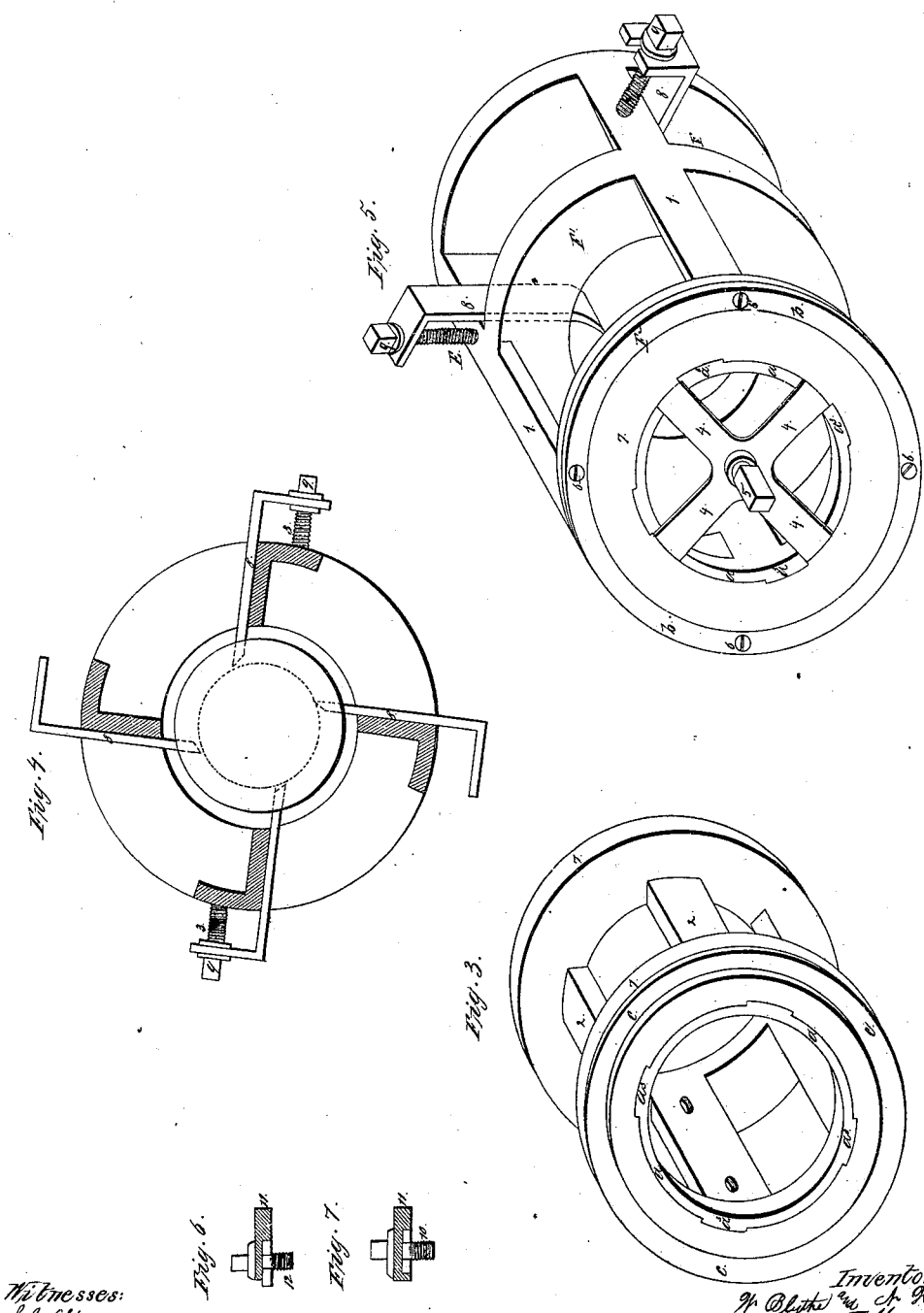

United States Patent Office.

WASHINGTON BLYTHE AND NATHANIEL HAYES, OF ALEXANDRIA, VIRGINIA.

*Letters Patent No. 76,702, dated April 14, 1868.*

IMPROVED APPARATUS FOR TURNING LOCOMOTIVE-CRANK PINS.

*The Schedule referred to in these Letters Patent and making part of the same.*

TO ALL WHOM IT MAY CONCERN:

Be it known that we, WASHINGTON BLYTHE and NATHANIEL HAYES, of the city and county of Alexandria, and State of Virginia, have invented a new and improved Machine for Turning Off Locomotive-Crank Pins in the wheel; and we do hereby declare the following to be a full, clear, and exact description of the same, sufficient to enable those skilled in the art to which our invention appertains to make use of it, reference being had to the accompanying drawings, forming part of this specification, in which—

Figure 1 is a longitudinal vertical section, representing the machine when clamped on the outer journal, and dressing the inner journal of the crank-pin.

Figure 2 is a cross-section.

Figure 3 is a detached perspective view of the inner or guide-cylinder.

Figure 4 is a cross-section through the line $x$ $x$ of fig. 1.

Figure 5 is a detached perspective view of the outer cylinder, enclosing, at its near end, the inner cylinder.

Figures 6 and 7 are edge views of the socket and pin designated as 10 and 11.

The object of this invention is to obtain a cheap, portable device, by the use of which the crank-pins of locomotive-wheels, after they have become worn, can be easily turned off without removing them from the wheel.

In the accompanying drawings, A represents the smaller, and B the larger journals of the crank-pin, which, in the description hereafter given, is supposed to be firmly attached to the wheel of the locomotive. It being impracticable to apply the pin, with the wheel thus attached to it, to a lathe, and great difficulty having always been experienced in turning off such pins, when they have once become worn from use, we have constructed a simple and practical device for the purpose, which obviates all the difficulties hitherto encountered, and renders the process easy, simple, and expeditious.

In the apparatus here described, for attaining this object, an inner cylinder is clamped upon one of the crank-pin journals, in such a manner that its axis coincides with the axes of the journals to be turned off. An outer cylinder, longer than the inner one, and bearing the cutting-tools, is then inserted over the inner cylinder, and rotates upon it, the cutting-tools opening on that journal which is not surrounded by the inner cylinder. Means are provided for perfectly adjusting the cylinders and cutting-tools to their work.

The form of the inner cylinder is fully shown in fig. 3, where it is seen detached from the rest of the apparatus. It consists of two rings, 7 7, connected together by a series of bars, 2 2, united to them at their inner edges. One end of the cylinder is provided with a dove-tail groove or channel, $a$, around the inner edge of the ring, the walls or shoulder of the groove being cut away at several points, $a^3$ $a^3$. The same end of the cylinder is also provided with a larger groove or channel, $c$, around the outer edge of the ring. Each bar, 2 2, is provided with two female screws, through which set-screws operate, as shown at 3 3, figs. 1, 2 and 4.

The cylinder being thus constructed, is inserted over the end of the crank-pin, as shown in fig. 1, and, by means of the set-screws 3 3, is adjusted carefully to a position concentric with the journal to be turned off. It may be adjusted either upon the journal A or B. When adjusted upon either, that end of the cylinder which contains the grooves $a$ and $c$ must be placed farthest from the middle collar or flange M of the pin, the smooth end of the cylinder coming over or near the collar. It being thus adjusted, one of the journals will be covered by the cylinder, as shown at A in fig. 1, and the other will come entirely outside of the cylinder, and can be operated upon by the cutting-tools, as hereafter described.

The general form and construction of the outer cylinder are clearly shown in fig. 5, and also in fig. 1. This cylinder is constructed of three rings, F F¹ F², connected by bars, 1 1, in the same manner as the cylinder before described, except that the bars are attached at the outer rather than the inner edge of the rings. This cylinder is made of such a size that it will fit closely over the inner cylinder above described, as shown in fig. 1, the bars 1 1 resting upon the rings 7 7, one end of the outer cylinder being flush with the end of the inner cylinder, as shown in figs. 1 and 5, and the other extending over and encompassing the whole length of the other journal. The outer cylinder being thus adjusted, can be rotated upon the inner one, the latter answering as a journal or spindle to hold it during its revolution; and, if they be properly constructed and fitted, the outer cylinder, when thus revolving, will be at all times concentric with both journals, A and B, its axis of revolution perfectly coinciding with their axes. If, then, cutting-chisels or tools be fixed upon it where it projects over the end of the inner cylinder, and be adjustable, so that they can be set in towards the journal of the crank-pin till they come in contact with it, then, by rotating the outer cylinder upon the inner one, the cutting-tools will be caused to turn off the journal to a perfectly true cylindrical form, as is required by the nature of the work it performs.

Such tools we therefore affix to the outer cylinder, shown at 8 8, and rendered adjustable by means of set-screws, 9 9. The tool may pass through a clamp or socket, 11, in order that it may be held, and applied firmly and steadily, and it may be guided by a screw or bolt, 10, projecting through a longitudinal slot in it, if thought necessary. The socket or tool may be also adjustable by side-screws, 12 12, by which it can be slightly inclined to one side or the other, so as to bring its cutting-edge fairly down upon the metal to be turned off.

In order to render the adjusting of the inner cylinder to the pin an easier matter, we construct a guide, designated by 4, in figs. 1, 2, and 5, and applied at the outer end of the pin. In applying this guide, and adjusting the cylinder upon it, we first, after placing the cylinder over the pin, place a pointed screw or rod, 5, which passes through the centre of the guide, against the end of the crank-pin, at its centre, as shown clearly in fig. 1. The guide being constructed with several arms, of the proper length, and notched or provided with a shoulder, as shown at $n$, fig. 1, we bring the ends of these arms opposite to those portions of the groove $a$ where the walls of the groove are cut away, as seen at $a^3$ $a^3$. We then bring the ends of the arms and the end of the inner cylinder together, when the arms enter the recesses $a^3$ $a^3$, until they rest against the bottom of the groove. Then the cylinder or guide is to be turned slightly around, when the ends of the arms will leave the spaces $a^3$ $a^3$, and pass in under the dove-tail walls of the groove $a$ $a$, in which position the guide and the end of the cylinder are firmly interlocked, and cannot be separated till the arms 4 4 are turned back to the recesses $a^3$ $a^3$ again. The arms 4 4 being of equal length, and the centre-screw 5 being carefully adjusted at the centre of the pin, the inner cylinder will be held in its proper position, and may be clamped in that position by means of the set-screws 3 3, above described, and the outer cylinder may be applied and operated as before explained.

In order to turn the outer cylinder, we attach to it stout arms, 13 13, by which it may be rotated by hand.

In fig. 5, the outer cylinder is represented in full, and the outer end of the inner cylinder, with the guide 4, is seen in position. The same adjustment is shown in fig. 1, the inner cylinder being there represented in full.

The inner cylinder may, however, be adjusted over the other journal, B, equally as well as over the journal A. When this is done, it must be turned end for end, and the outer cylinder must also be reversed and placed upon it, bringing the cutting-tools over the journal A. The guide 4 may then be applied to the outer cylinder, at the end of the pin, in the same manner as above described, in connection with its application to the inner cylinder, the end of the outer cylinder adjoining that part which carries the cutting-tools being provided with a dove-tail groove similar to that shown in the inner cylinder at $a$ $a$, and for the same purpose. The ring $F^2$ is so constructed that when the outer cylinder is placed in position for work, the inner edge of the ring bears upon the bottom of the channel or rebate $c$, on the end of the inner cylinder, the side-wall of the ring bearing against the side-wall of the channel, and preventing the outer cylinder from slipping on any farther. The inner cylinder then being clamped in place, one of its walls bears against the wall of ring $F^1$, and the other against the inner side-wall of ring $F^2$, as just described, holding the outer cylinder from moving longitudinally in either direction, and causing it to work with perfect accuracy.

We have described the putting of the parts together, more with reference to clearness of description than to the regular sequence of the operations in practice. In the shop we should adjust the outer upon the inner cylinder, and affix the guide 4 in place, and then apply the instrument to the crank-pin, adjusting it by the set-screws 3 3 and guide 4, as above described.

Having thus described our invention, what we claim as new, and desire to secure by Letters Patent, is—

1. The reversible and adjustable end-centring device, in combination with the outer and inner cylinder, or either of them, when combined therewith substantially as described.

2. We also claim the exterior cylinder, carrying the tools 8 8, in combination with the inner and stationary cylinder, when arranged substantially in the manner set forth.

WASHINGTON BLYTHE,
NATHANIEL HAYES.

Witnesses:
NATHAN K. ELLSWORTH,
CHAS. A. PETTIT.